(12) United States Patent
Buck

(10) Patent No.: US 6,318,199 B1
(45) Date of Patent: Nov. 20, 2001

(54) LOAD EQUALIZING POWER TONG GEAR TRAIN

(76) Inventor: David A. Buck, 1348 Sawmill Hwy., Breaux Bridge, LA (US) 70517

( * ) Notice: Subject to any disclaimer, the term of this patent is extended or adjusted under 35 U.S.C. 154(b) by 0 days.

(21) Appl. No.: 09/483,895

(22) Filed: Jan. 18, 2000

(51) Int. Cl.[7] .............. B25B 17/00; F16H 55/18
(52) U.S. Cl. .............. 74/410; 74/411; 74/664; 74/440; 81/57; 81/57.15
(58) Field of Search .......... 81/57, 57.15, 57.16, 81/57.17, 57.18, 57.19, 57.2, 57.21; 74/410, 411, 664, 440

(56) References Cited

U.S. PATENT DOCUMENTS

| | | | |
|---|---|---|---|
| 1,637,379 | * 8/1927 | Jensen | 74/410 |
| 2,566,561 | * 9/1951 | Edelberg | 81/57.16 |
| 2,584,172 | * 2/1952 | Underwood | 74/410 |
| 3,167,967 | * 2/1965 | Silberger | 74/411 |
| 3,396,594 | * 8/1968 | Walker | 74/409 |
| 3,499,343 | * 3/1970 | Burkhardt et al. | 74/411 |
| 3,541,897 | * 11/1970 | Horton | 81/57.18 |
| 4,084,453 | * 4/1978 | Eckel | 81/57.18 |
| 4,485,697 | * 12/1984 | Heilhecker et al. | 81/57.2 |
| 4,831,897 | * 5/1989 | Dobbs | 74/411 |
| 5,113,713 | * 5/1992 | Isabelle et al. | 74/410 |

* cited by examiner

Primary Examiner—Thomas R. Hannon
Assistant Examiner—William C Joyce
(74) Attorney, Agent, or Firm—Lance A. Foster; Robert C. Tucker; Bernard F. Meroney

(57) ABSTRACT

An improved power tong gear train which includes a ring gear having an open or closed throat. At least three idler gears are positioned such that at least two of the idler gears engage the ring gear through the ring gear's entire range of rotation. The gear train further has at least one stage of reduction gears engaging the idler gears and has a power gear transferring torque to a stage of the reduction gears. Also disclosed is a power tong gear train having a load equalizing gear. The gear train includes a ring gear which has at least one idler gear engaging the ring gear. At least one stage of reduction gears engages the idler gears and a power gear transfers torque to a stage of the reduction gears. A load equalizing mechanism is attached to at least one of the gears.

17 Claims, 7 Drawing Sheets

LOAD EQUALIZING POWER TONG GEAR TRAIN

BACKGROUND OF THE INVENTION

The present invention relates to power tongs typically used in the oil and gas industry to make up and break apart threaded joints on pipe, casing and similar tubular members. In particular, this invention relates to an improved gear train used within power tongs.

Power tongs have been in existence for many years and are generally employed in the oil and gas industry to grip and rotate tubular members, such as drill pipe. It is necessary to grip drill pipe with high compressive forces while applying a high degree of torque in order to break apart or tighten threaded pipe connections. In most cases, power tong designs employ a cam mechanism for converting a portion of the torque into a gripping (compressive) force normal to the pipe. This conversion is often accomplished utilizing a power-driven ring gear having an interior cam surface. A cam follower (roller) on a jaw member rides upon the cam surface. As the ring gear is rotated, the follower (and thus the jaw member) is urged into contact with the pipe.

For purposes of describing the prior art, reference may be made to the power tong seen in FIG. 1. Power tong 1 has a body 2 a top plate 4 which is shown partially cut away in FIG. 1. A, ring gear 6 is rotatively mounted within body 2 on roller bearings 8 and includes a set of neutral cam surfaces 17 and positive cam surfaces 18 formed on the inner perimeter of ring gear 6. Cage plates 16 are positioned within ring gear 6 (although the top cage plate has been removed for clarity in FIG. 1) and act as jaw carriers for jaw members 15. Power tong body 2 has an open throat 5 and ring gear 6 as a corresponding open throat 10. While throat 10 is shown out of alignment with throat 5 in FIG. 1, it will be understood that throat 5 and throat 10 may be aligned in a "neutral" position to allow the insertion of a tubular member 14 into tong body 2. Power tong 1 grips tubular 14 by way of relative movement between cage plate 16 and ring gear 6. When ring gear 6 is rotated out of the neutral position as shown in FIG. 1, the jaw members 15 move onto positive cam surfaces 18 and grip tubular 14. Once tubular 14 is griped, ring gear 6 will continue rotating in order to connect or disconnect a threaded joint formed between two tubulars. The foregoing is well known in the art and disclosed in references such as U.S. Pat. No. 5,291,808 to Buck and U.S. Pat. No. 4,084,453 to Eckel, both of which are incorporated by reference herein.

The rotation of ring gear 6 is caused by the power tong gear train 19 which is shown schematically in FIG. 1 and can be seen more clearly in FIG. 2. FIG. 2 illustrates the mechanical relationship of ring gear 6 to gear train 19, but omits details of ring gear 6 (such as cam surfaces) which are not necessary to the understanding of the present invention. Ring gear 6 will have a series of teeth 7 around its perimeter except for the opening of throat 10. Gear train 19 comprises the set of gears transferring power from motor 24 to ring gear 6. All gears in gear train 19 have teeth 7 and are mounted on a gear bearing shaft 23 upon which the gears may freely rotate, all of which is well known in the art. In the illustrated gear train 19, a set of idler gears 25 engage and transfer torque to ring gear 6. Another gear 22 transfers torque to idler gears 25 and gear 22 in turn has torque transferred to it by pinion gear 26. Pinion gear 26 comprises an upper pinion gear 27 and a lower pinion gear 28. It will be understood that upper pinion gear 27 and a lower pinion gear 28 are fixed to one another and must rotate in unison as is well known in the art. Lower pinion gear 28 engages motor gear 29 such that torque may be transferred from motor 24, through gear train 19, to ring gear 6. It will be readily apparent that one purpose of gear train 19 is to convert the relatively high speed, low torque rotation of motor 24 to lower speed, higher torque rotation at ring gear 6. Thus, the gear train will have at least one and typically several stages of speed reduction and torque elevation. Each reduction stage is accomplished by transferring power from a gear with a smaller number to teeth to a gear with a larger number of teeth. In FIG. 2, it can be seen that there is a first reduction stage between motor gear 29 and lower pinion gear 28, a second reduction stage between upper pinion gear 27 and gear 22, and a third reduction stage between gear 22 and ring gear 6.

While the gear train 19 of FIG. 2 has been the standard in the power tong industry, it suffers from certain serious disadvantages. First, it can be seen that with every revolution of ring gear 6, there is a moment of time when throat 10 encounters each of the idler gears 25 and causes that idler gear 25 to cease transferring torque to ring gear 6. Therefore, the idler gear 25 not encountering throat 10 must bear the entire torque load being transferred to ring gear 6. This torque load can be considerable when the power tong is torquing up a fully threaded connection or is breaking apart a tightly connected joint. This large and unbalanced torque load acting on only one idler gear 25 introduces undesirable stresses into gear train 19. Furthermore, since each idler gear must be designed to bear the entire torque load, the gears must be sized accordingly. This results in the gears having an increased thickness or depth. For clarity, this depth dimension "d" is shown in FIG. 4. The increased size of individual gears in gear train 19 is undesirable on account of the increase in weight and material costs. Moreover, the weight and cost disadvantages are considerably increased in relation to ring gear 6, whose depth dimension must match that of idler gears 25. As is apparent from FIG. 2, ring gear 6 is by far the most substantial gear component of the power tong. Thus, increasing the size of ring gear 6 substantially increases the overall weight and materials cost of the power tong.

Another disadvantage of the prior art gear train is unequal loading across the idler gears caused by the initial application of torque to a stationary ring gear 6. Power tongs typically operate in an environment where drilling mud, grit and small solids are likely to come into contact with the gear train. Gear trains are consequently designed so that the teeth 7 mesh with comparatively loose tolerances so that grit and outside contaminants are less likely to obstruct the operation of the gear train. However, this loose tolerance design means that when idler gears 25 begin turning to apply torque to a stationary ring gear 6, the teeth 7 of both idler gears 25 do not necessarily engage teeth 7 of the ring gear 6 at precisely the same moment. For example, the teeth 7 of the lower idler gear 25 seen in FIG. 2 may be in actual contact with teeth 7 of ring gear 6, while the teeth 7 of the upper idler gear 25 may be just short of contact with the teeth 7 of ring gear 6. Thus, when motor 24 begins transferring power through gear train 19, lower idler gear 25 will for a short time bear a much greater load than upper idler gear 25. Any such momentary unbalanced load situation creates damaging stresses throughout the gear train. These stresses particularly effect the shafts and bearings upon which the gears rotate.

A third disadvantage with prior art gear trains relates to stresses generated when the ring gear abruptly stops rotating. For example, when working with tubulars such as API drill pipe which has free running threads, the female section of the threaded joint will have an internal shoulder which the male section will contact prior to the full length of the threads becoming engaged. Thus, the tubular will abruptly stop rotating as the male section contacts the shoulder, causing ring gear 6 to likewise abruptly stop. The stress of this abrupt stoppage is of course transferred through the entire gear train and is a highly undesirable effect.

OBJECTS AND SUMMARY OF THE INVENTION

It is therefore an object of this invention to provide a power tong gear train which does not transfer the full load of the ring gear to a single idler gear.

It is another object of this invention to provide a power tong gear train which is lighter than hereto known in the art.

It is still another object of this invention to provide a power tong gear train which reduces stresses placed on the gear train when the ring gear abruptly stops rotating.

It is a still further object of the invention to provide a power tong gear train which equalizes the, load within the gear train upon the start of ring gear rotation.

Therefore one embodiment of the present invention provides an improved power tong gear train which includes a ring gear which may have an open or closed throat. At least three idler gears are positioned such that at least two of the idler gears engage the ring gear through the ring gear's entire range of rotation. The gear train further has at least one stage of reduction gears engaging the idler gears and has a power gear transferring torque to a stage of the reduction gears.

Another embodiment of the present invention provides a power tong gear train having a load equalizing gear. The gear train includes a ring gear which has at least one idler gear engaging the ring gear. At least one stage of reduction gears engages the idler gears and a power gear transfers torque to a stage of the reduction gears. A load equalizing mechanism is attached to at least one of the gears.

DETAILED DESCRIPTION

Figure 3:
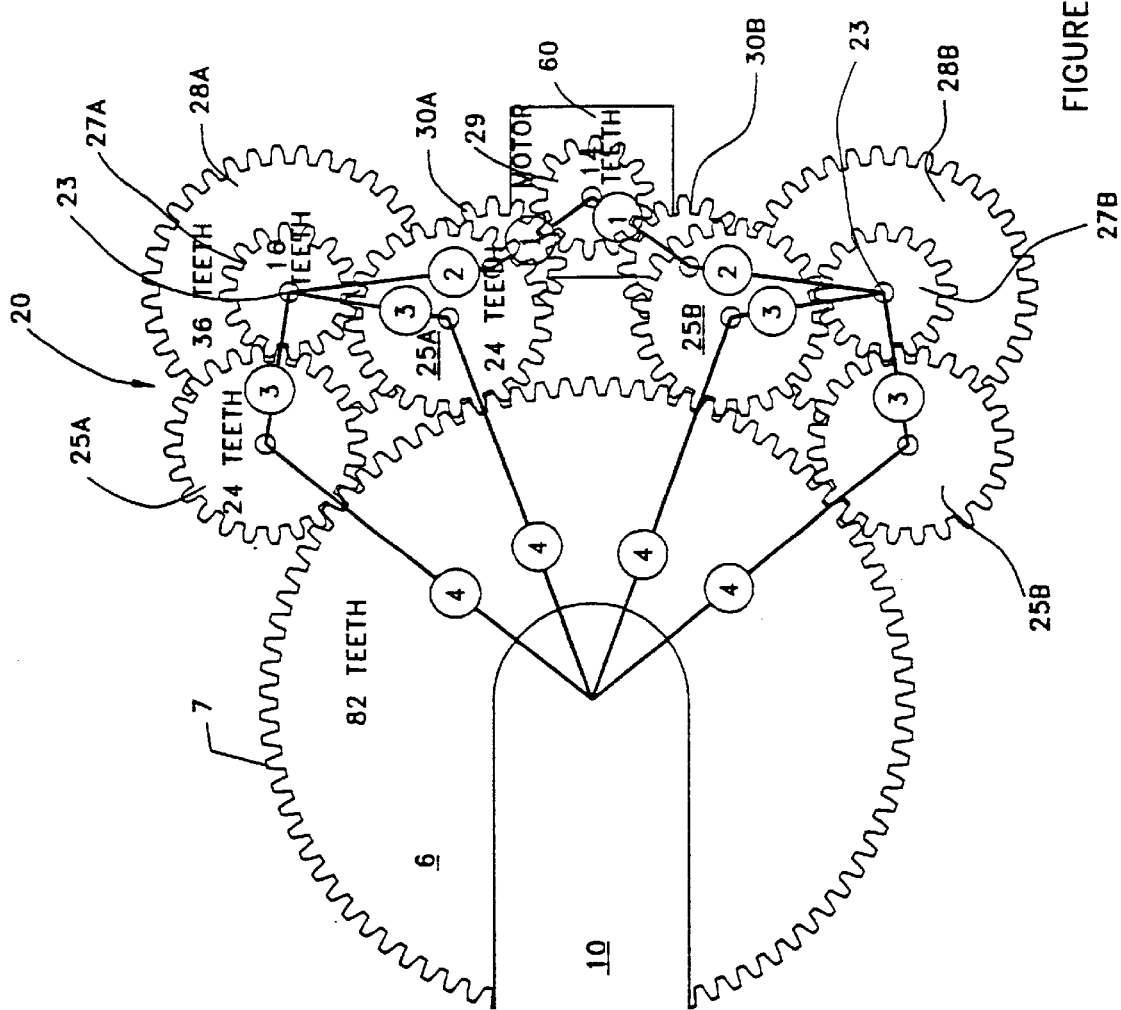
FIG. 3 is an embodiment of the improved gear train of the present invention.

FIG. 3 illustrates one embodiment of the present invention which includes a novel gear train 20 which overcomes one of the above described disadvantages found in the prior art. As seen in FIG. 3, gear train 20 has at least three idler gears 25 engaging ring gear 6. The gear train 20 of FIG. 3 specifically discloses four idler gears 25, but other embodiments having only three or more than four idler gears 25 are considered within the scope of the present invention. It can be readily seen that as throat 10 of ring gear 6 rotates past one of the idler gears 25, the other three idler gears 25 will maintain contact with the teeth of ring gear 6. In this manner, it can be assured that no single idler gear 25 is required to bear the entire torque load transmitted through the gear train.

It can also be seen that the gear train 20 of FIG. 3 is effectively divided into upper and lower halves, with idler gears 25a in the upper half and idler gears 25b in the lower half. It will be understood that this configuration splits the load from ring gear 6 between the upper and lower half of gear train 20. This splitting of the load reduces stresses on the gear bodies, the gear shafts and bearings. Additionally, because at least one idler gear 25a will engage ring gear 6 as throat 10 passes the upper two idler gears 25a, the remaining gears in the upper half of gear train 20 will always be under load and not forcing the lower half of gear train 20 to bear the entire load of ring gear 6. Naturally, the same condition exists when throat 10 is passing idler gears 25b. This configuration insures that the torque load remains balanced between the upper half and lower half of the gear train. In addition to eliminating the stresses caused by an unbalanced loading condition, the gear train 20 shown in FIG. 3 insures that more than one idler gear 25 is always in contact with ring gear 6. This results in each idler gear 25 carrying a lesser torque load and allows idler gears 25 to be designed with a lesser depth dimension. The lesser depth of idler gears 25 allows the depth of ring gear 6 to be likewise reduced, all of which leads to a substantially reduced weight and materials cost for the power tong without reducing the tong's torque rating (i.e. the amount of torque the power tong can transfer to a tubular). Alternatively, if the same gear depth is maintained as required in the prior art, but the four idler gear embodiment is employed, it follows that the torque rating of the power tong will be substantially increased.

Figure 4:
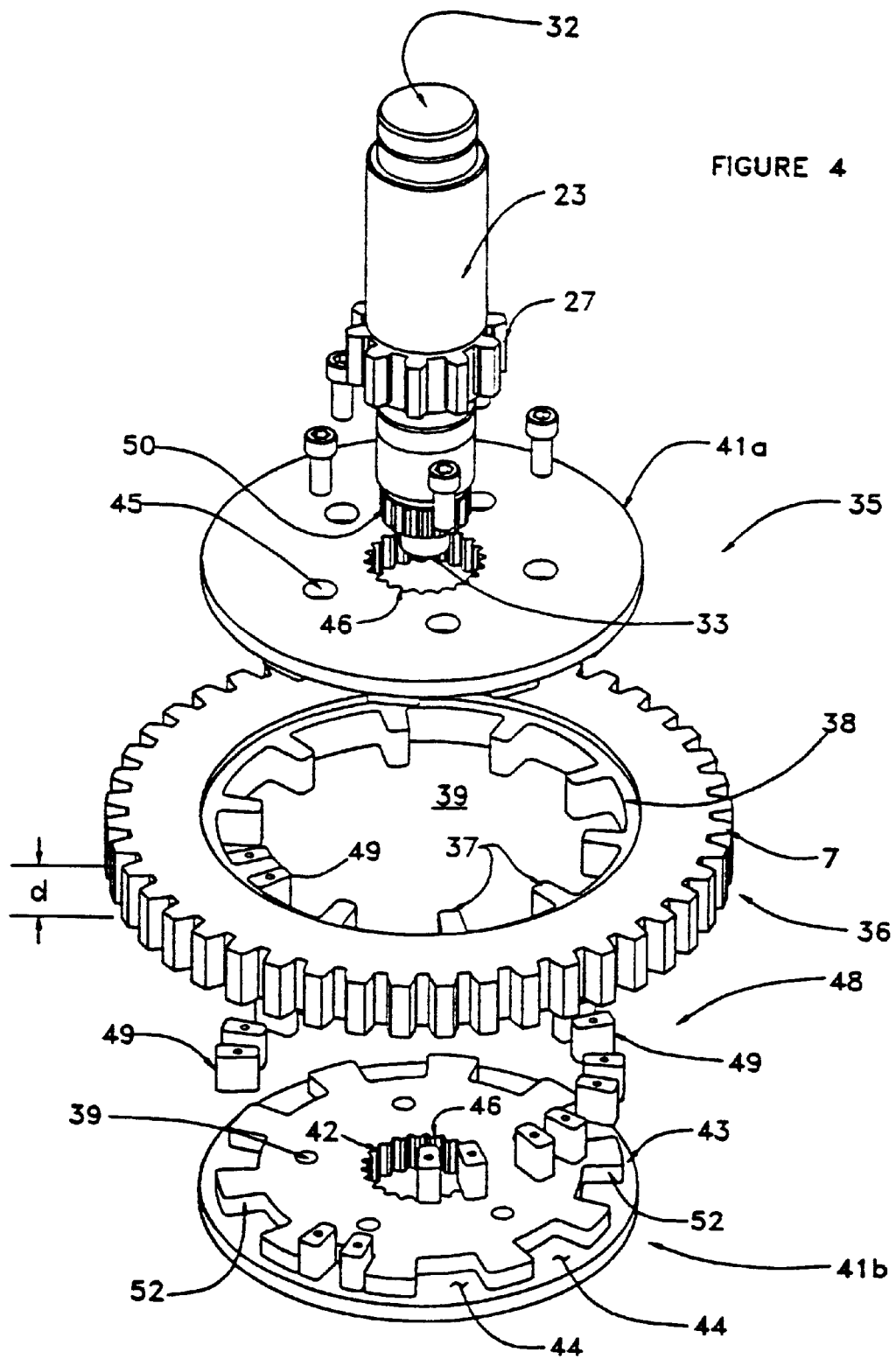
FIG. 4 is an exploded view of the load equalizing gear of the present invention.
Figure 5:
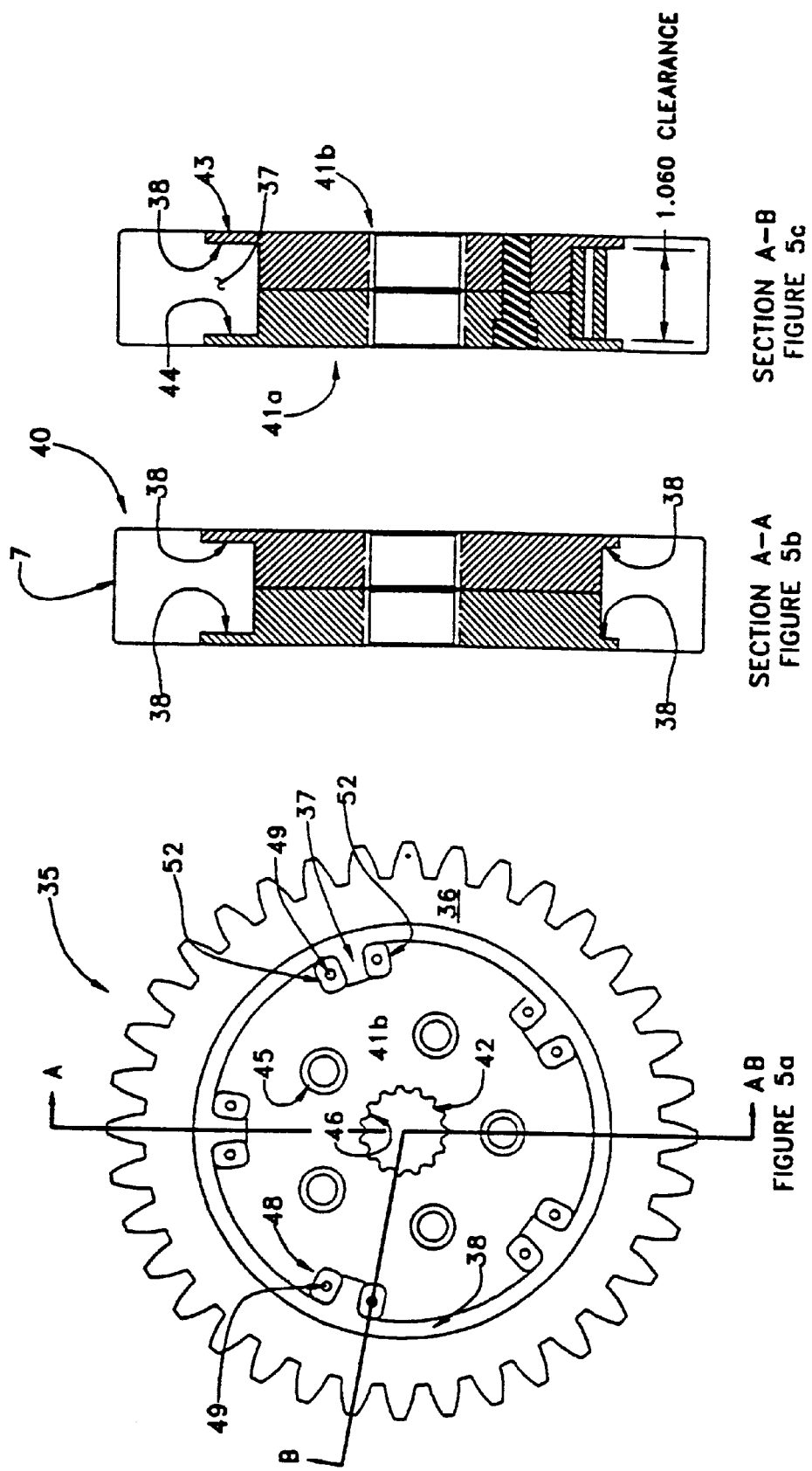
FIG. 5a is a top view of the gear body with the bottom gear plate in position, but the top gear plate removed.
FIG. 5b is a cross-sectional view of FIG. 5a along the line A—A, but with the addition of the top gear plate.
FIG. 5c is a cross-sectional view of FIG. 5a along the line A–B, but with the addition of the top gear plate.

As discussed above, stress is often introduced into gear train 20 when the gears begin movement or abruptly stop moving. One aspect of the present invention is an apparatus which reduces these undesirable stresses. FIGS. 4 and 5 illustrate a load equalizing mechanism which in the embodiment shown is a load equalizing gear 35. FIG. 4 is an exploded view of load equalizing gear 35. Load equalizing gear 35 will generally comprise a gear body 36 and upper and lower gear plates 41. Upper and lower gear plates are largely identical, but where necessary to distinguish between the two, the upper gear plate will be designated as 41a and the lower gear plate as 41b. FIG. 5a illustrates gear body 36 with lower gear plate 41b in place, but upper gear plate 41a removed. Viewing FIG. 4, gear body 36 will include a series of teeth 7 and a center opening 39. Around the circumference of center opening 39 will be a milled shoulder 38. As best seen in the cross-sectional view of FIG. 5b, milled shoulders 38 will be cut into gear body 36. Extending from milled shoulder 38 into center opening 39 will be a plurality of fingers 37. FIG. 5b also illustrates how milled shoulders 38 will be found on both surfaces of gear body 36.

FIGS. 4 and 5 also illustrate the upper and lower gear plates 41. FIGS. 4 and 5a show the internal side of gear plate 41b which will include a gear connector 42 which in this embodiment is a splined connecting aperture 46 which will be explained in greater detail below. Gear plate 41 will also include milled lip edge 43 extending around the circumference of gear plate 41. A phlrality of milled finger pockets 44 also extend inward from lip edge 43, with finger pockets 44 being defined on either side by pocket edges 52. Gear plates 41 will have a series of bolt apertures 45 formed therethrough. It can be seen in FIG. 4b how lip edge 43 and finger pockets 44 are milled into gear plate 41. It can also be seen in FIG. 5c how milled lip edge 43 will mate with shoulder 38 of gear body 36 and finger pockets 44 fit over fingers 37 when upper gear plate 41a and lower gear plate 41b are placed on each side of gear body 36. The upper and lower gear plates 41 will be held in place by bolts extending through bolt apertures 45.

FIGS. 4 and 5a illustrate how load equalizing members or biasing devices 48 are positioned within finger pockets 44 and on either side of finger 37. In the embodiment shown, biasing devices 48 are resilient members 49 formed of polyurethane and are in effect polyurethane "springs". Naturally, biasing devices 48 are not limited to polyurethane springs or any other type of spring, but may be any mechanism or material which allows a finger 37 to temporarily move toward a finger pocket edge 52 and allows mechanical energy to be absorbed, before finger 37 returns to a "neutral" or a rest position between the two edges 52. It will be readily apparent that biasing devices 48 act to dampen or absorb the force of any relative movement between gear body 36 and gear plates 41.

The purpose and operation of load equalizing gear 35 may be understood with reference to FIGS. 3 and 5. Gear shaft 23 seen in FIG. 4 illustrates an upper bearing point 32, a lower bearing point 33, and a splined end 50. While not shown, it is well known in the art how upper bearing point 32 may engage a shaft aperture in the upper plate of the power tong while lower bearing point 33 engages a lower shaft aperture in the lower plate of the tong. As is also well known in the art, the shaft apertures will contain bearings which allow gear shaft 23 to rotate freely therein. Splined end 50 will engage the splined aperture 46 of lower gear plate 41b while another set of splines on gear shaft 23 (hidden from view under upper pinion gear 27) engage spline aperture 46 on upper gear plate 41a. When load equalizing gear 35 is fully assembled as in FIG. 5b, it may be substituted for lower pinion gears 28 seen in FIG. 3. Upper pinion gears 27 are fixed to gear shaft 23 (by way of a conventional splined connection not shown) and splines 50 (as seen in FIG. 4) will mate with splined aperture 46 of gear plates 41. In this manner, gear plates 41 and upper pinion gear 27 are both fixed to gear shaft 23, forcing gear plates 41 to rotate in unison with upper pinion gear 27. Thus, when load equalizing gear 35 is positioned within the gear train 20 of FIG. 3, torque on upper pinion gear 27 is directly transferred to gear plates 41.

To illustrate the operation of load equalizing gear 35, consider the above described stress created in gear train 20 when the ring gear 6 is rotating and comes to an abrupt stop. Without the inclusion of load equalizing gear 35, the abrupt cessation of rotation is transmitted through idler gear 25, to upper pinion 27, lower pinion 28, gear 30, to motor 60 which is still supplying torque to gear train 20. It will be apparent that this sequence of events places significant stresses on gear train 20 and/or motor 60. However, if load equalizing gear 35 is positioned as lower pinion gear 28, it can be seen how most of this stress can be dampened or absorbed. When ring gear 6 stops abruptly and stress is transferred from idler gears 25 to upper pinion gears 27, the force is not directly transferred to the teeth on lower pinion gear 28. Rather, the force is first transferred from upper pinion gear 27 to gear plates 41. As gear plates 41 tend to rotate, an edge 56 of each gear pocket 44 will press against the biasing devices 48.

Biasing devices 48 will tend to deform prior to displacing fingers 37. This deformation of biasing devices 48 will greatly reduce the stress transferred from upper pinion gear 27 through lower pinion gear 28 and eventually to motor 60.

Load equalizing gear 35 also reduces stress on the gear train in the situation where ring gear 6 is initially at rest and idler gears 25 are just beginning to apply torque to ring gear 6. As described above in reference to FIG. 3, it is common for one idler gear 25 or set of idler gears 25 (for example idler gears 25b in the lower half of gear train 20) to engage ring gear 6 prior to idler gears 25a engaging ring gear 6. However, when load equalizing gear 35 is employed within gear train 20, idler gears 25b will not be forced to bear the full load of ring gear 6. As idler gears 25b begin to exert torque on ring gear 6, this torque is transferred to upper pinion gear 27b. As described above, upper pinion gear 27b places torque on gear plates 41 which cause pocket edges 52 to move against biasing devices 48. It will be understood that as biasing devices 48 deform in the lower load equalizing gear 35 (positioned as lower pinion gear 28), upper idler gears 25a will be allowed to move sufficiently to come into effective contact with the teeth of ring gear 6. Therefore, prior to all displacement in lower load equalizing gear 35 being taken up, upper idler gear 25a is in a position to share the load of ring gear 6 with lower idler gear 25b. In this manner, neither idler gears 25 in either the upper or lower half of gear train 20 are placed under the full load of a stationary ring gear 6 while torque is initially be applied to ring gear 6.

Figure 6:
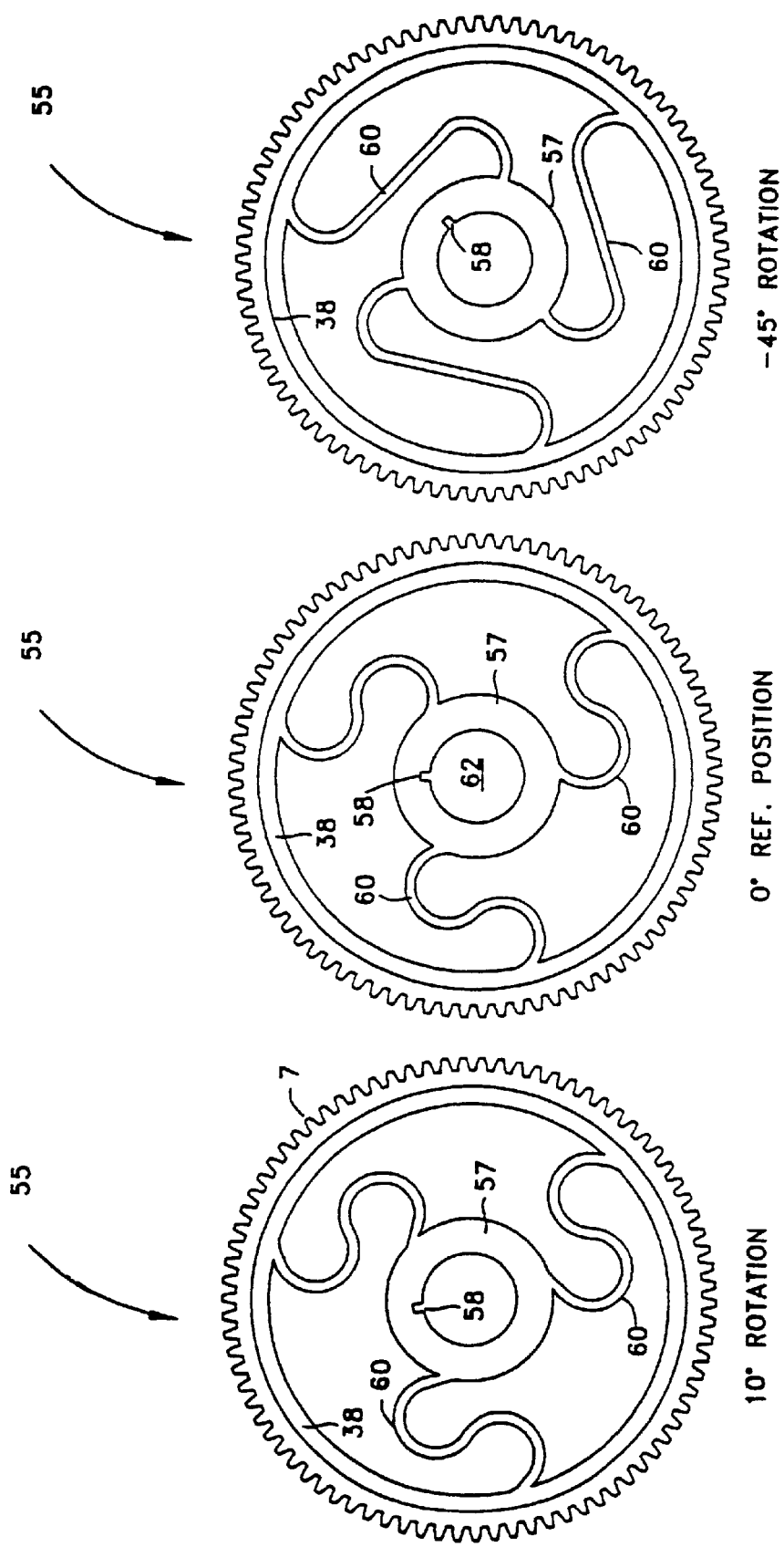
FIG. 6 is a top view of an alternate embodiment the gear body of the present invention.

FIG. 6 illustrates an alternate embodiment of a gear body which may be used to form a load equalizing gear 35. Gear body 55 is similar to gear body 35 in that it has teeth 7 and a milled shoulder 38 to support gear plates 41. However, the load equalizing mechanism is not a structure of fingers and finger pockets with springs therein. Rather, the load equalizing mechanism is a series of flexible spokes 60 extending between center ring 57 and shoulder 38. Center ring 57 will have an aperture 62 and a key notch 58. Key notch 58 will serve the same purpose as splined aperture 66 in FIG. 5a; it will serve as a gear connector between center ring 57 and another gear such as upper pinion gear 27 as previously discussed. Thus, center ring 57 may rotate, but the rotation will not be immediately transferred to teeth 7 because flexible spokes 60 will resiliently deform. In this manner, flexible spokes 60 may be used as an alternative to the fingers and finger pockets described in reference to FIGS. 4 and 5. Flexible spokes 60 may be constructed of any sufficiently flexible but resilient material such as spring steel or the like. Flexible spokes 60 may take any shape that will allow them to deform with rotation as suggested by FIGS. 6a, 6b and 6c. From the foregoing description, it can be seen how flexible spokes 60 act as a load equalizing member mechanically positioned between the gear connector (i.e. center ring 57) and the teeth 7 of gear body 55.

Figure 1:
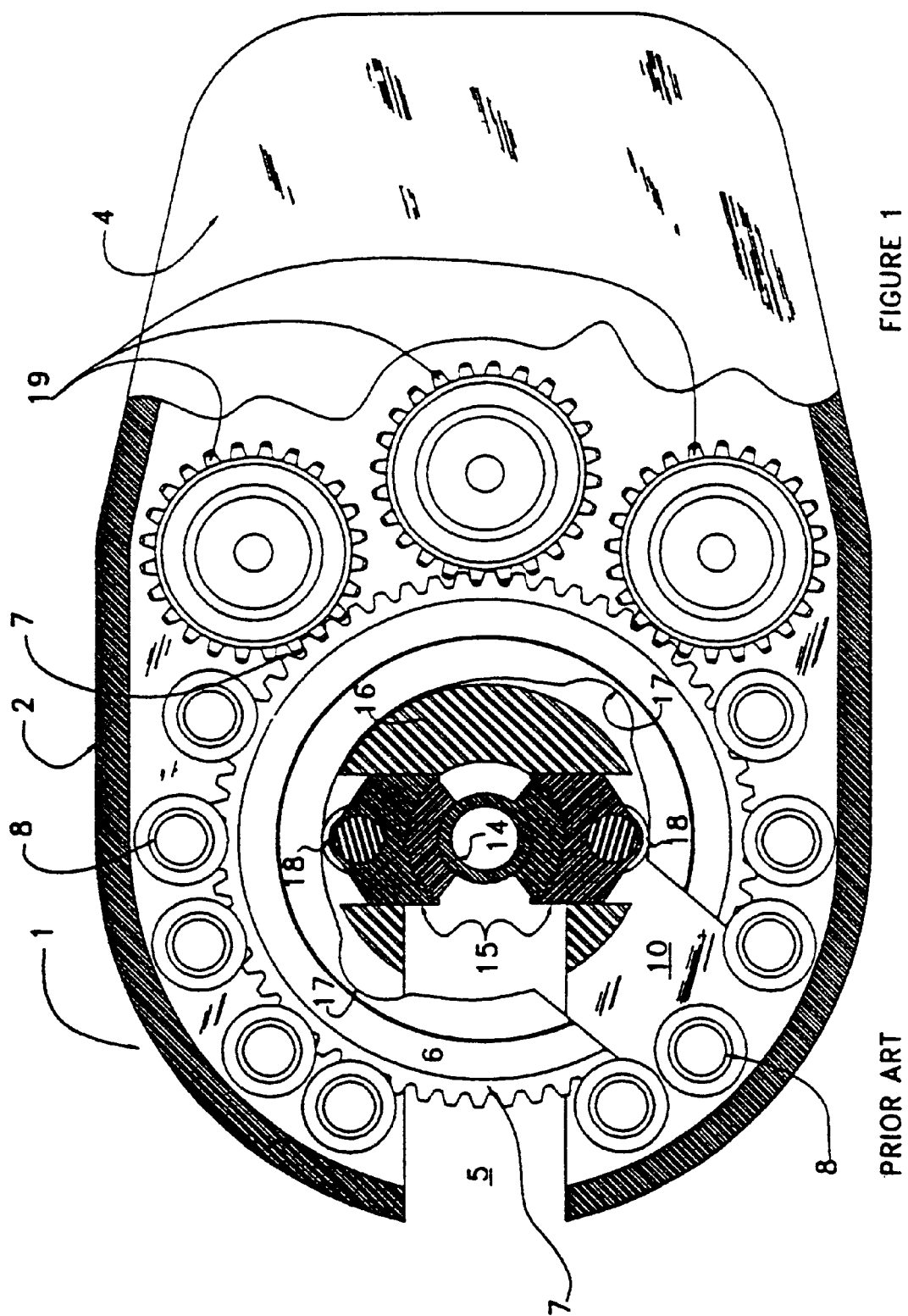
FIG. 1 is top view of a prior art power tong with the top plate partially cut away.
Figure 2:
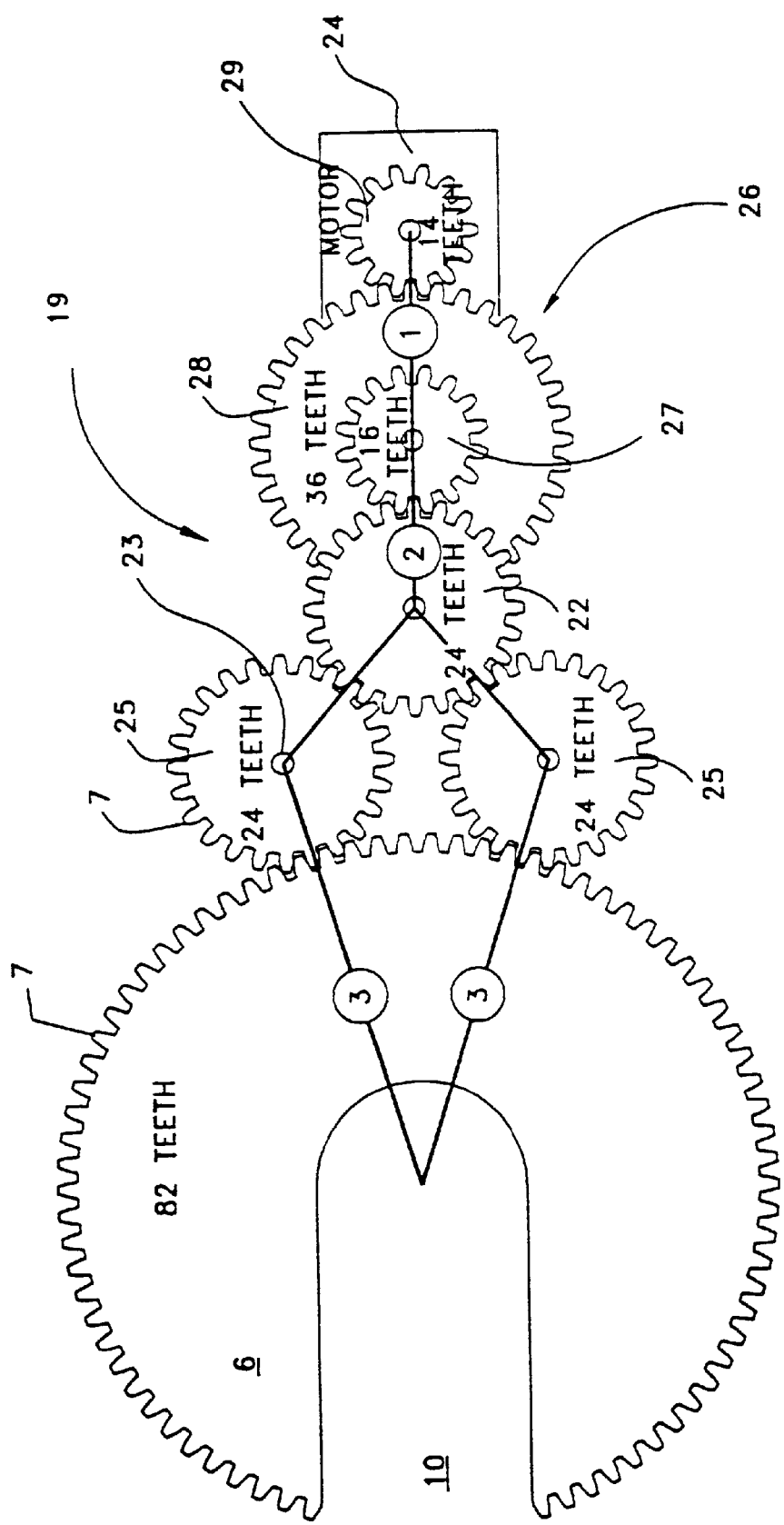
FIG. 2 is a top view of a typical gear train in a prior art power tong.
Figure 7:
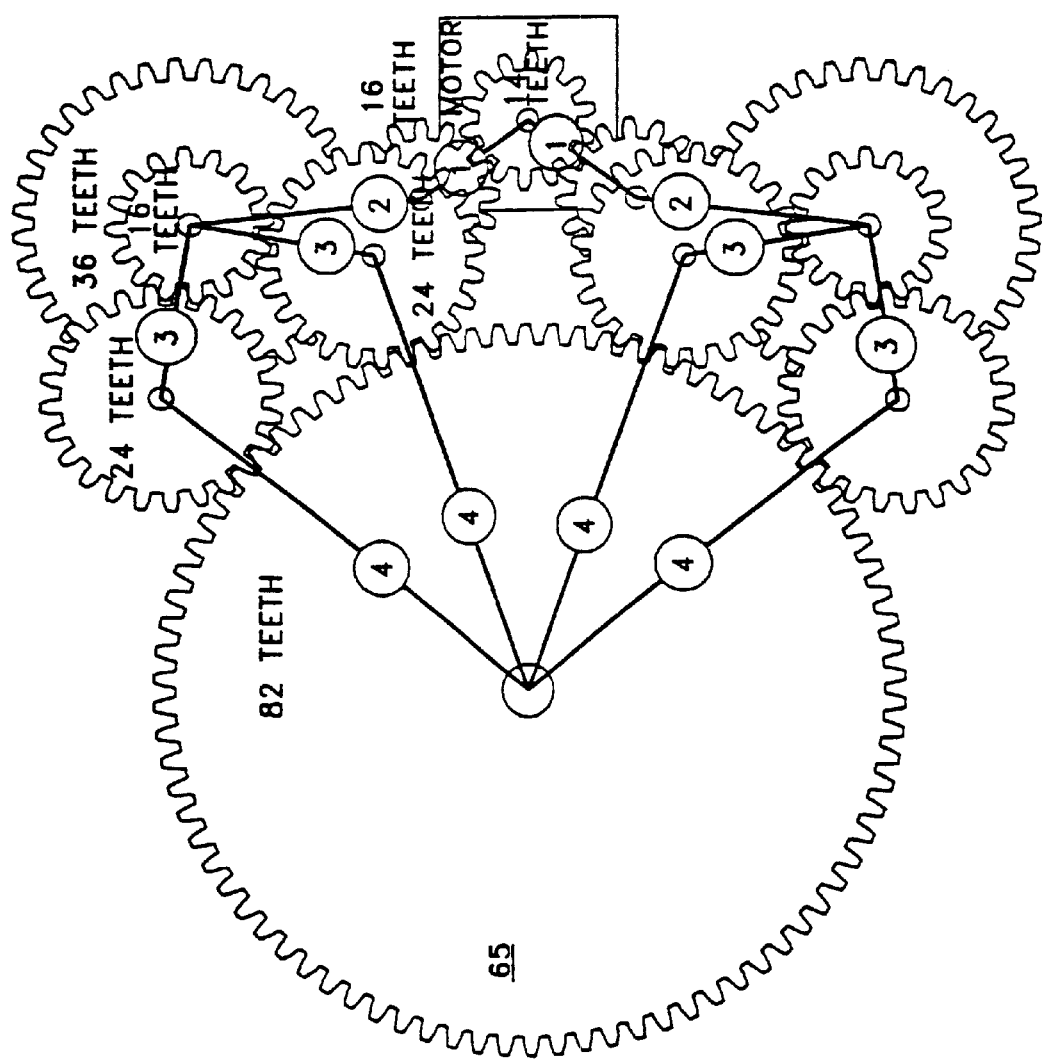
FIG. 7 is a top view of the gear train of the present invention utilized in conjunction with a closed throat ring gear.

The above disclosure illustrates the many and versatile variations the present invention may take. It is believed that those skilled in the art will recognize many other embodiments which fall within in the scope of the present invention. For example, the while load equalizing gear 35 has been described as replacing lower pinion gear 28 in FIG. 3, it is also within the scope of the invention that load equalizing gear 35 be substituted for upper pinion gear 27 or possibly even for another gear in the gear train. Likewise, while load equalizing gear 35 has been described in conjunction with gear train 20 and two pinion gears 26, it will be understood that load equalizing gear 35 would also make a novel and highly improved gear train when used in conjunction with prior art gear trains such as the gear train 19 seen in FIG. 2. Nor is the use of the present invention limited to use with gear trains having open throated ring gears. As seen in FIG. 7, a gear train having a closed throat (i.e. teeth surrounding the entire perimeter) ring gear 65 may also form part of the improved gear train of the present invention. These embodiments and all other equivalent or obvious variations and modifications of the present invention are intended to come within the scope of the following claims.

I claim:

1. A gear train for a power tong comprising:
   a. a ring gear having an open throat;
   b. at least four idler gears engaging said ring gear, said idler gears being positioned such that at least two of said idler gears engage said ring gear through said ring gear's entire range of rotation;
   c. at least one stage of reduction gears engaging said idler gears; and
   d. a power gear transferring torque to a stage of said reduction gears.

2. The power tong gear train according to claim 1, wherein said gear train includes multiple stages of reduction gears.

3. The power tong gear train according to claim 2, wherein said gear train includes 4 stages of reduction gears.

4. The power tong gear train according to claim 1, wherein said stage of reduction gears includes pinion gears.

5. A gear train for a power tong comprising:
   a. a ring gear having an open throat;
   b. at least three idler gears engaging said ring gear, said idler gears being positioned such that at least two of said idler gears engage said ring gear through said ring gear's entire range of rotation;
   c. at least one stage of reduction gears engaging said idler gears; and
   d. a power gear transferring torque to a stage of said reduction gears;
   e. wherein one of said gears is a load equalizing gear.

6. The power tong gear train according to claim 5, wherein said load equalizing gear is positioned within a stage of reduction gears.

7. The power tong gear train according to claim 5, wherein said load equalizing gear is a pinion gear.

8. The power tong gear train according to claim 5, wherein said load equalizing gear includes a gear connector, a plurality of teeth and a load equalizing member mechanically positioned between said gear connector and said teeth.

9. The power tong gear train according to claim 8, wherein said gear connector is a splined aperture.

10. The power tong gear train according to claim 5, wherein said load equalizing gear includes a gear body having a plurality of teeth, a gear plate having a splined aperture and a load equalizing member mechanically positioned between said gear body and said gear plate.

11. The power tong gear train according to claim 10, wherein said gear body includes an open center area with fingers extending into said center area, said gear plate includes a finger pocket having an edge, and said load equalizing member is positioned between said finger and said edge of said finger pocket.

12. The power tong gear train according to claim 11, wherein said finger pocket of said gear plate has two edges and said load equalizing member is position between each of said two edges and said finger.

13. The power tong gear train according to claim 10, wherein said gear body forms a lower pinion gear and an upper pinion gear engages said splined aperture.

14. The power tong gear train according to claim 10, wherein said gear body forms an upper pinion gear and a lower pinion gear engages said splined aperture.

15. The power tong gear train according to claim 10, wherein said gear body has two sides and a gear plate is positioned on each side of said gear body.

16. The power tong gear train according to claims 8, 11, or 12 wherein said load equalizing member comprises a resilient material.

17. The power tong gear train according to claim 16, wherein said resilient material is polyurethane.

* * * * *